United States Patent Office 3,331,261
Patented July 18, 1967

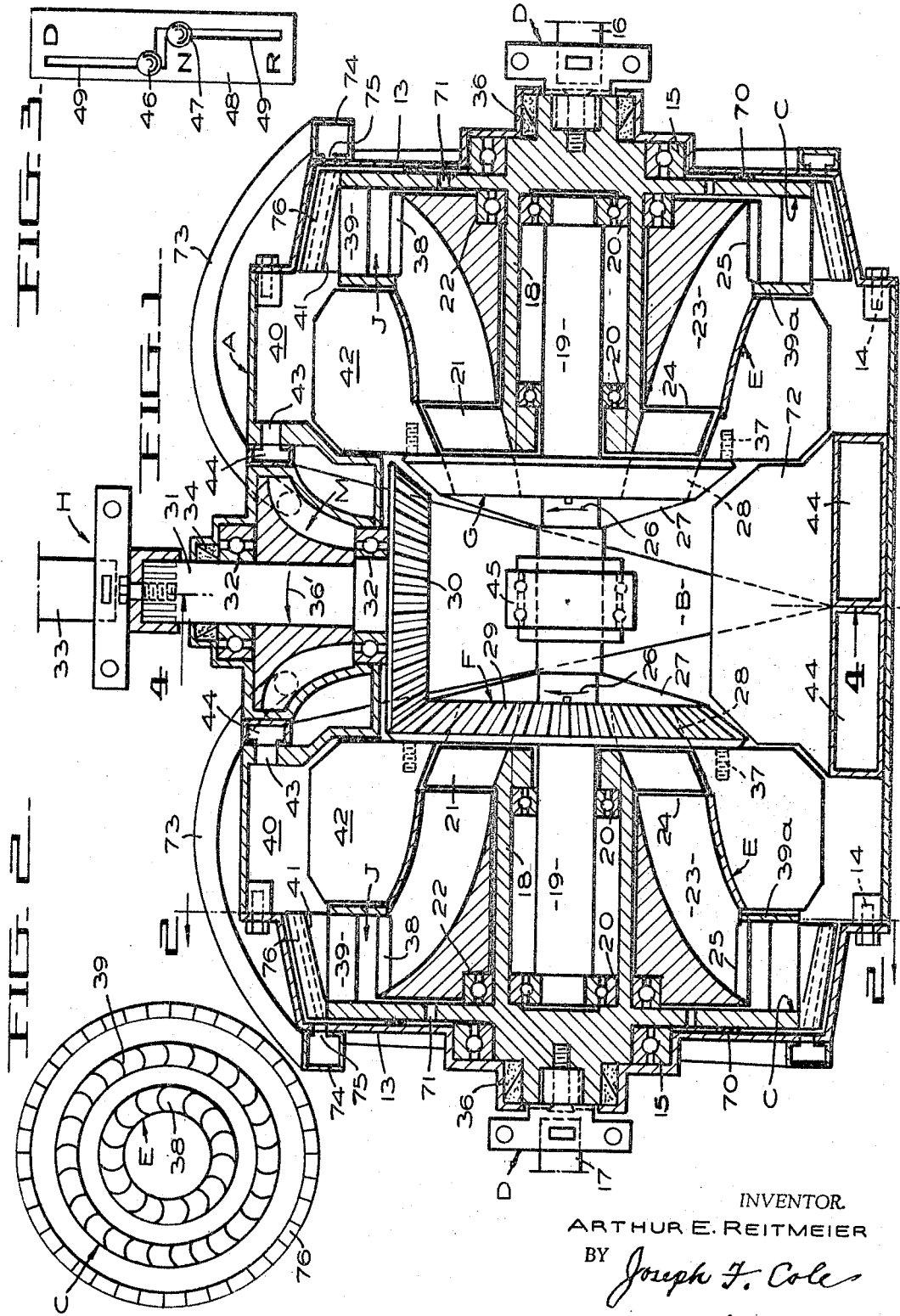

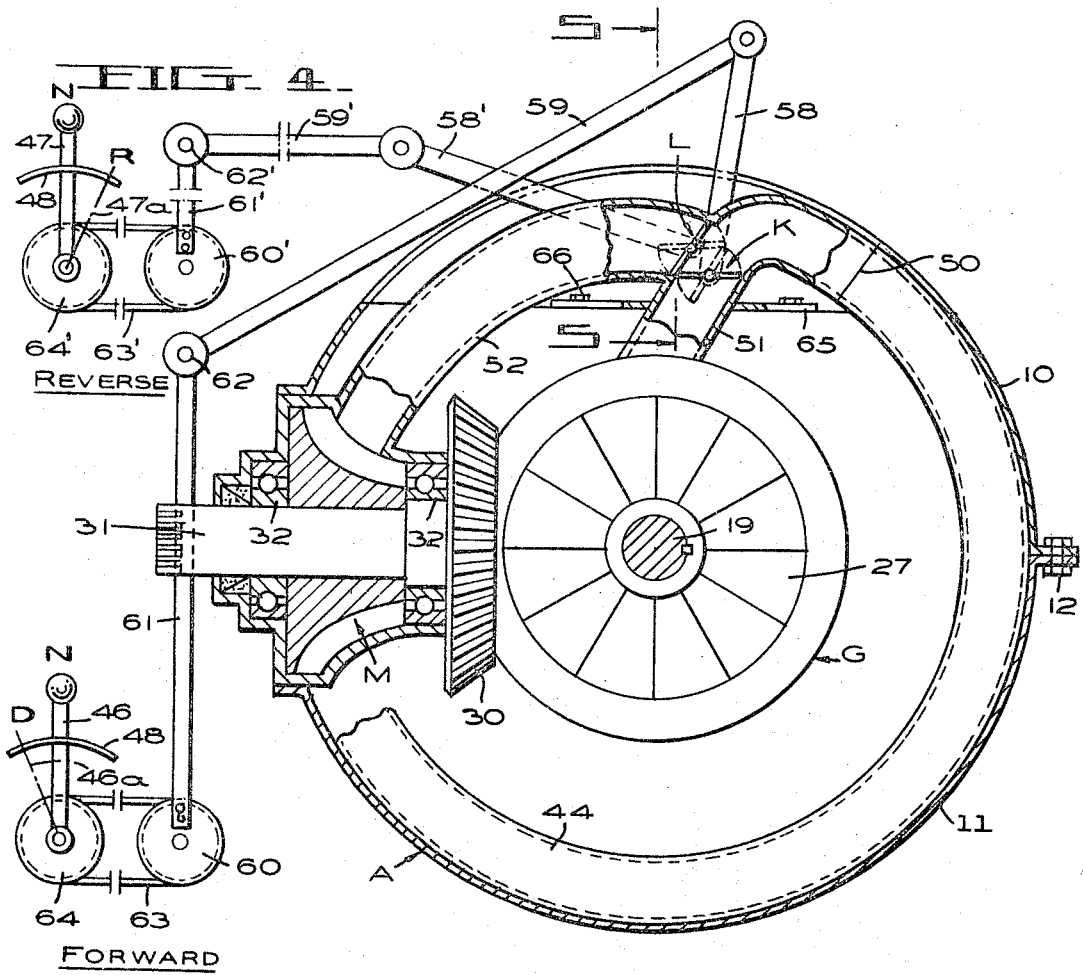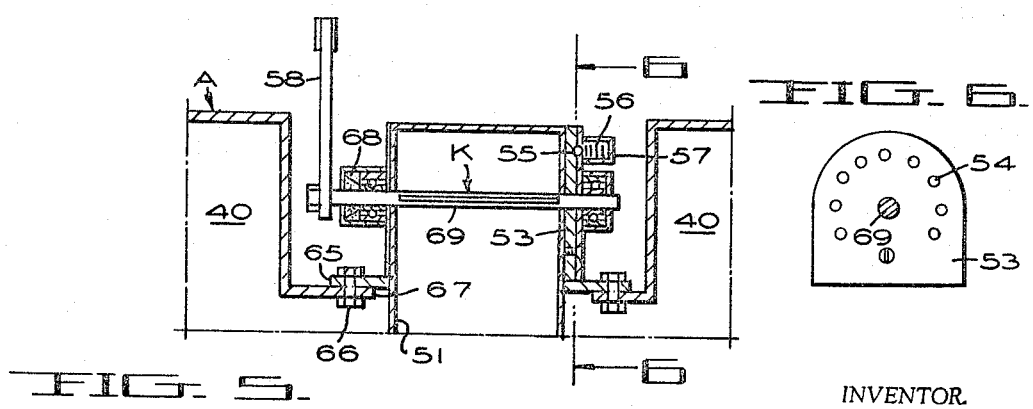

3,331,261
TORNADO DRIVE TRANSMISSION AND DIFFERENTIAL
Arthur E. Reitmeier, 2024 Monroe Ave.,
Belmont, Calif. 94002
Filed Apr. 30, 1965, Ser. No. 452,321
9 Claims. (Cl. 74—650)

ABSTRACT OF THE DISCLOSURE

A tornado drive transmission and differential having a pair of outboard end axle turbines, and a pair of tornado funnels supported for rotation relative to the axle turbines. A pair of oil-directing impellers are mounted in an oil-receiving compartment between the funnels and the funnels have rows of inboard blades against which oil is forced from the compartment by the impellers so as to rotate the funnels. The latter convey the forced oil to rows of blades on larger outboard ends of the funnels and to annular Saturn ring spaces provided between these rows of blades on the larger outboard ends of the funnels and rows of inwardly extending blades on the axis turbines to drive the latter, the oil in the Saturn ring spaces being spun with high pressure. Return ducts convey the oil back to the compartment after leaving the Saturn ring spaces, when the transmission is in "forward drive." Each axle turbine is provided with reverse turbine blades against which oil is discharged by a pump to effect "reverse drive."

---

The present invention relates to a tornado drive transmission and differential. It consists of the combinations, constructions and arrangement of parts, as hereinafter described and claimed.

An object of this invention is to provide a combined transmission and differential that may be installed between the two rear wheels of an automobile to replace the conventional differential, and to eliminate the usual transmission as a separate unit.

It is proposed in this invention to utilize a pair of tornado funnels that are arranged to pick up oil at their smaller ends and to discharge this oil at the larger ends of the funnels, providing a Saturn ring of spinning oil moving at a high velocity and utilized to drive the rear wheels of the automobile.

The term "tornado Saturn ring" gets its name from the theory that is used in order to arrive at the design of the differential and the transmission. The Saturn ring of oil fits on the top of a tornado that is created. A tornado is spun from the top and force is present at the bottom of the funnel. In this tornado drive the oil is started to spin at the smaller end of the funnel and the force is applied at the larger end of the funnel which is called the Saturn ring, because it is contained. In a sense, the theory of this unit is in reverse of the force of a tornado.

This unit is intended to be mounted on the frame or body of the car and have universals and axles going out to the rear wheels. The rear end of the car is intended to be suspended by torsion bars and air-oil suspension at the rear wheels similar to the way the Citroen car is suspended at the front end. The car that this unit is intended to be used in is intended to use the standard clutch on the flywheel. The reason for this is for starting the engine in cold weather and also for disconnecting the tornado drive from the engine while the engine is being tested, etc.

Other objects and advantages will appear as the specification continues. The novel features of the invention will be pointed out in the appended claims:

Drawings

For a better understanding of the invention, reference should be had to the accompanying drawings, forming part of this specification, in which:

FIG. 1 is a horizontal sectional view taken through my tornado drive transmission and differential.

FIG. 2 is a face view in reduced scale of certain of the blades as seen from the plane 2—2 of FIG. 1.

FIG. 3 is a top plan view of a selector used for controlling the forward and reverse valves.

FIG. 4 is a longitudinal sectional view taken along the plane 4—4 of FIG. 1.

FIG. 5 is a sectional view taken through the forward valve, as seen from the plane 5—5 of FIG. 4.

FIG. 6 is a face view of a detent plate as observed from the plane 6—6 of FIG. 5.

While I have shown only the preferred embodiment of my invention, it should be understood that various changes, or modifications, may be made within the scope of the appended claims without departing from the spirit thereof.

Detailed description

Referring now to the details of the drawings, there has been provided a housing designated generally at A, defining upper and lower sections 10 and 11, respectively, which are secured together by bolts 12 (see FIG. 4). Also, opposite end covers 13 form part of the housing and may be secured in place by bolts 14 (see FIG. 1). This arrangement provides a central compartment B for containing oil that is required for the combined transmission and differential.

As clearly illustrated in FIG. 1, opposite end axle turbines C are mounted on bearings 15 carried by the end covers 13. These turbines are coupled to the right rear and left rear axles 16 and 17, respectively, by suitable universals D. The turbines C have tubular sleeves 18 in which a funnel shaft 19 is mounted by bearings 20. The inboard ends of the turbine sleeves 18 are formed with blades 21 thereon that receive oil from the central compartment B in the manner hereinafter described.

Moreover, tornado funnels E surround the tubular sleeves 18 and are supported thereon for rotation by bearings 22. These funnels have inclined passages 23 leading from the smaller inboard ends 24 of the funnels to the larger outboard ends 25 thereof.

It will be noted from FIG. 1 that oil-directing impellers F and G are mounted in the central compartment B and both are secured to the funnel shaft 19 so as to rotate together in the direction of the arrows 26. As shown in the drawings, these two impellers are provided with spaced inclined blades 27 that project into the central compartment B and cause oil to be picked or scooped up and forced through openings 28 in the impellers against the blades 21 of the axle turbines C. The openings 28 are provided between the blades 27.

For the purpose of rotating the impellers F and G, the former is provided with a ring gear 29 that meshes with a pinion 30. However, the periphery of the impeller G does not have a ring gear and it is out of contact with the pinion 30. This pinion is secured to a propeller stub shaft 31 that is mounted in bearings 32, and this stub shaft is connected by a universal H to the main propeller shaft 33. The latter extends forwardly to the usual clutch (not shown) on the flywheel of the engine. An oil seal 34 may be provided for the stub shaft 31, and likewise oil seals 36 may be used on the opposite end axle turbines C (see FIG. 1). The stub shaft 31 is rotated in the direction of the arrow 36'.

As disclosed in FIG. 1, the oil-directing impellers F and G are secured by studs 37, or the like, to the left and right tornado funnels E so as to rotate the latter. The larger outboard ends of the funnels have blades 38 formed thereon (see FIGS. 1 and 2), while inwardly extending blades 39 on the opposite end axle turbines C overlie but are spaced outwardly beyond the blades 38 on the tornado funnels E. As shown in FIG. 2, the blades 38 and 39 are curved in opposite directions and an annular Saturn ring space J is provided between the rows of blades 38 and 39 in which a ring of spinning oil is formed and having the highest point of oil pressure in the unit.

When oil supply is available in the central compartment B, this oil will be inclined to start spinning in this throat area which is round. Half of the oil will go to the left and half to the right. This oil will go through the openings 28 between the blades 27 of the oil-directing impellers F and G. These blades will compress the oil and air against the blades 21 that are on the inboard ends of the axle turbines C. The oil will then be picked up by blades 38 after flowing through the passages 23, and the latter blades will put more pressure on the oil in the Saturn ring space J. The spinning oil hits the blades 39 on the axle turbines C and drives the axles 16 and 17. This oil is directed into the area 40 by the inclined flange 41 of the reverse turbine. Blades 42 on the tornado funnels E are spinning with the funnels and the impellers F and G. There will be air pressure between the blades 42 and the oil in the areas 40. As the air is spinning, it moves the oil with it at a slower rate. The oil moves inboard through the openings 43 into return ducts 44. Rings 39a are secured to blades 39 so that oil must pass through these blades when leaving the space J.

It will be noted from FIG. 4 that forward and reverse butterfly valves K and L, respectively, are provided that will control the unit and thereby controlling engine r.p.m., fuel economy and direction of movement of the car. These butterfly valves are intended to be mounted in the return oil ducts 44 right over the two center bearings 45 in the central compartment B through which the funnel shaft 19 extends.

The valves K and L are controlled by sticks 46 and 47, respectively, that has the feel of detents for desired selection of operation, as hereinafter described in detail. As shown in FIGS. 3 and 4, a selector plate 48 has slots 49 fashioned therein and defining a half of an "H," with a "D" being indicated at one end for forward drive, an "R" at the opposite end for reverse drive, and an "N" at the midpoint for neutral position. The sticks 46 and 47 are guided in the slots 49.

The returning oil from the left and right funnels E enter the ducts 44 in the manner previously mentioned, and these ducts extend around the aft end of the unit and meet at the point 50 just aft of the butterfly valves K and L (see FIG. 4). Then the oil is directed into the central compartment B through a conduit 51 for forward movement, or into a conduit 52 that is coupled to a pump M for reverse movement, depending upon which butterfly valve is opened. The function of the pump M, when it is desired to operate the unit in reverse, will be set forth as the specification continues.

Both valves K and L are shown by full lines in FIG. 4 as being closed. In this position, the displaced oil can back up between the funnel blades 42 (see FIG. 1).

Referring now to FIGS. 5 and 6, a stationary plate 53 has been shown in connection with the valve K. This plate has a series of depressions or holes 54 into which a ball 55 of larger diameter than the depressions may be urged by a spring 56, the latter being held in place by a cover plate 57. The valve K is actuated by an arm 58, the latter having a link 59 swingably connected thereto (see FIG. 4). A rotatably mounted pulley 60 has an arm 61 fixed thereto, and the upper end of this arm is swingably attached by a pin 62 to the link 59. A cable 63 is trained around the pulley 60 and is further trained around a second pulley 64 that is rotatably supported and has the lower end of the stick 46 fixed thereto.

It will be apparent that the forward valve K will be opened as the stick 46 is moved toward the drive position "D," as indicated by the dot dash line 46a in FIG. 4.

For the purpose of controlling the reverse butterfly valve L, the latter is provided with an arm 58' that is connected to a link 59' which in turn is connected by a pin 62' to the upper end of an arm 61'. The lower end of this arm is fixed to a pulley 60' that is rotatably supported and has a cable 63' extending therearound, and this cable passes around a pulley 64' which is supported for rotation and is turned by the stick 47. When the stick 47 is moved toward the reverse position, indicated by "R" in FIG. 4, so as to occupy the dot-dash line position 47a, the unit will move the car in a reverse direction.

When drive position is selected, the reverse valve L forms a wall of conduit 51; and when the reverse position is selected, the forward valve K forms a wall of conduit 52.

The housing that contains the tornado drive unit has a very important role to make it possible for the drive unit to function properly. The butterfly valves K and L are mounted above a plate 65 that is secured by bolts 66 over an opening 67 formed in the upper part of the housing above the central compartment B (see FIGS. 4 and 5).

Of course, the reverse butterfly valve L will be provided with a stationary detent plate, a ball and a spring, all arranged in the same manner as the detent plate 53, the ball 55 and the spring 56 shown in FIG. 5. An oil seal 68 has been disclosed in FIG. 5 as surrounding the shaft 69 on which the valve K is mounted.

When both valves K and L are closed no torque will be transmitted to the rear axles 16 and 17. One of the features of this type of differential and transmission is that the selector sticks 46 and 47 can be moved at any time without taking the driver's foot off the engine throttle. When going up a hill the selector stick 46 could be moved toward neutral (N) position, thereby giving higher engine r.p.m. in relation to torque applied at the rear wheels. When descending down a grade the selector stick 47 could be put into reverse; and then by pressing the engine throttle towards open, a braking effect would result without doing any damage to the transmission unit.

When reverse is selected, a high oil pressure will build up between the end covers 13 and the opposite end axle turbines C. Accordingly, a close tolerance ring 70 has been provided at each end of the housing, as shown in FIG. 1, and bleed holes 71 have been formed in the axle turbines C to relieve the seals 36 of excessive pressure of the oil.

It will be obvious that when the clutch on the flywheel is engaged, the axles 16 and 17 will be turned in directions to move the car forward when the valve K is opened and the valve L is closed. When both of these valves are closed, the unit can only pump air which is not enough to move the car, because the blades are designed to pump oil and not air, and the r.p.m. is too slow to be efficient in pumping air. However, air will always mix with the oil and it is desired to let the air travel with the oil. Most of the foaming will take place in the returning oil. Thereby the unit will always be separating the air from the oil by spinning it, and the air will always travel to the center of the spinning oil. In the return system, the air will always be putting pressure on the oil from the inside outward, thereby keeping a supply of oil available at the butterfly valves.

Oil from the left and right return ducts 44 will meet at the butterfly valves and return to the central compartment B when the valve K is open. The throat area in the central compartment B is made smaller by displacement blocks 72 (see FIG. 1). When both valves K and L are closed and the unit is spinning, some displacement oil could go between the funnel blades 42.

When reverse is selected, the return of oil to the central compartment B through the conduit 51 is stopped, and the oil is directed to the pump or compressor M through the conduit 52, when the valve L is opened. The oil thus directed to the pump will be conveyed through conduits or by-passes 73 to collector rings 74 (see FIG. 1). The oil is spinning backwards in the collector rings and is directed through openings 75 against reverse turbine wheel blades 76 formed on the outer periphery of each end axle turbine C (see FIGS. 1 and 2). This feature would work similar to a jet engine starter; the theory would be similar but this would be using oil instead of air.

A smooth surface is intended on the outlets of the collector rings 74. The oil would leave the collector rings through the openings 75 to direct the oil in reverse rotation of the opposite end axle turbines C. The reason for the smooth surface on the face of the collector rings is so that when oil is between the blades 76 of the reverse turbine wheel and the face of the collector rings, hardly any braking would take place until the accelerator is stepped on to create high flow and high pressure directed at the curved turbine wheel blades 76.

When the unit is in forward torque some oil would be expected to back up into the reverse collector rings 74. However, this would cause very little drag and as soon as the turbine wheels C picks up speed the centrifuge would keep the oil out of the collector rings. The ends of the blades 76 would be such on their ends as to push the oil away instead of scooping it up.

When the blades 39 hold just the right amount of oil pressure in the Saturn ring space J so that not too much oil is let through, and still enough oil does go through as to not cause too much delay when a new selection is made, a correct balance will be the answer. A certain amount of oil will always be returning but no more than is needed to make the unit do what it is intended to accomplish.

This unit has to have a breather, and this can be accomplished by a line from the pump M to a tank (not shown) well above the unit and have it pressurized by an engine driven pump to a pressure that would be suitable to prevent excessive foaming of the oil in the unit. When the engine is shut down, the air would automatically be bled off.

It will be apparent that the axles 16 and 17 may be turned relative to one another so as to function as a differential when required, since neither axle turbine C is directly connected to its associated funnel C. In addition to this being both a transmission and differential, it differs from conventional differentials in that when the wheel on the axle 16 spins the other wheel on the axle 17 has the maximum torque applied thereto.

I claim:
1. In a tornado drive transmission and differential:
 (a) a housing defining an oil-receiving compartment;
 (b) a pair of outboard end axle turbines mounted in the housing for rotation in either direction, car axles connected to these turbines to be turned by the latter, each axle turbine being provided with a row of blades at its inboard end;
 (c) a pair of tornado funnels supported for rotation relative to the axle turbines, each tornado funnel being disposed adjacent to and outboard of the inboard row of blades of one of the axle turbines;
 (d) each tornado funnel having a smaller inboard end and a larger outboard end, and inclined passages leading from the smaller inboard end to the larger outboard end of the funnel;
 (e) a rotatable funnel shaft extending through the compartment and being disposed axially relative to the axle turbines, a pair of oil-directing impellers mounted in the compartment and being secured to the funnel shaft so that both impellers rotate together, each impeller being secured to the adjacent funnel to rotate the latter;
 (f) these impellers having spaced inclined blades projecting into the compartment so as to scoop up oil therefrom, and the impellers having openings through which the scooped oil may be forced against the inboard blades of the axle turbines to rotate the latter;
 (g) the inboard ends of the inclined passages of the funnels being located adjacent to the inboard blades on the axle turbines to receive the oil forced from the inboard blades of the axle turbines so that these passages will convey the oil to the larger outboard ends of the tornado funnels for discharge;
 (h) the larger outboard ends of the tornado funnels having a row of blades thereon;
 (i) a row of inwardly extending blades on the axle turbines overlying but spaced from the blades on the larger outboard ends of the tornado funnels to provide an annular Saturn ring space between these rows of blades on the axle turbines and tornado funnels, respectively, to constitute an area of high pressure oil, rings bridging the spaces between these rows of blades, respectively, and being secured to these inwardly extending blades on the axle turbines so that the oil must pass through the latter blades when leaving the annular Saturn ring spaces, thereby driving the axle turbines;
 (j) and means including a main propeller shaft operable to rotate the oil-directing impellers in the same direction.

2. The tornado drive transmission and differential, as set forth in claim 1;
 (k) and in which the blades on the larger outboard ends of the tornado funnels and the inwardly extending blades on the axle turbines are curved in opposite directions.

3. The tornado drive transmission and differential, as set forth in claim 1;
 (k) and in which the compartment is located substantially centrally of the housing;
 (l) one oil-directing impeller being disposed at one end of the compartment and the other oil-directing impeller being disposed on the opposite end of the compartment;
 (m) one axle turbine and the adjacent tornado funnel being located toward one end of the housing, and the other axle turbine and the adjacent tornado funnel being located toward the opposite end of the housing.

4. The tornado drive transmission and differential, as set forth in claim 1;
 (k) and in which each axle turbine is provided with a sleeve on which the adjacent tornado funnel is mounted for rotation.

5. The tornado drive transmission and differential, as set forth in claim 1,
 (k) and in which each axle turbine is provided with a row of reverse turbine wheel blades on its outer periphery made to effect a reverse movement of the axles when oil is discharged against these blades;
 (l) return ducts disposed to receive the oil after discharge from the Saturn ring spaces;
 (m) a conduit communicating with the return ducts to receive the returning oil therefrom, and this conduit having a manually actuated "reverse drive" valve therein to regulate the rate of flow of oil therethrough;
 (n) a pump communicating with said conduit to receive returning oil therefrom;
 (o) and by-pass conduits extending from the pump to deliver the oil to the reverse movement blades on the axle turbines.

6. The tornado drive transmission and differential, as set forth in claim 1;
 (k) and in which return ducts are provided for conveying the oil back to the compartment after leaving the Saturn ring spaces.

7. The tornado drive transmission and differential, as set forth in claim 6;
 (1) and in which a second set of blades are provided on the tornado funnels in positions adjacent to the Saturn ring spaces to spin the oil and entrained air after leaving the Saturn ring spaces.

8. The tornado drive transmission and differential, as set forth in claim 6;
 (1) and in which a manually actuated "forward drive" valve is provided between the return ducts and the compartment to regulate the rate of return flow of the oil.

9. The tornado drive transmission and differential, as set forth in claim 5;
 (p) and in which tubular collector rings are mounted on opposite ends of the housing to convey oil from the by-pass conduits to the reverse movement blades.

References Cited
UNITED STATES PATENTS

| | | | |
|---|---|---|---|
| 2,229,228 | 1/1941 | Sutter | 74—650 |
| 2,353,060 | 7/1944 | Norman | 74—650 |
| 2,416,396 | 2/1947 | Landrum | 74—650 |
| 2,465,919 | 3/1949 | Novak | 74—650 |
| 2,468,107 | 4/1949 | Powell | 74—650 |

FRED C. MATTERN, Jr., *Primary Examiner.*

DAVID J. WILLIAMOWSKY, *Examiner.*

C. J. HUSAR, *Assistant Examiner.*